United States Patent
Larsson et al.

(10) Patent No.: US 9,847,863 B2
(45) Date of Patent: Dec. 19, 2017

(54) PAGING PROCEDURES USING AN ENHANCED CONTROL CHANNEL

(71) Applicant: Telefonaktiebolaget L M Ericsson (publ), Stockholm (SE)

(72) Inventors: Daniel Larsson, Vallentuna (SE); Robert Baldemair, Solna (SE); Jung-Fu Cheng, Fremont, CA (US); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 653 days.

(21) Appl. No.: 13/818,127

(22) PCT Filed: Jan. 30, 2013

(86) PCT No.: PCT/SE2013/050073
§ 371 (c)(1),
(2) Date: Feb. 21, 2013

(87) PCT Pub. No.: WO2014/120055
PCT Pub. Date: Aug. 7, 2014

(65) Prior Publication Data
US 2014/0211750 A1 Jul. 31, 2014

(51) Int. Cl.
*H04L 5/00* (2006.01)
*H04W 68/02* (2009.01)

(52) U.S. Cl.
CPC .......... *H04L 5/0053* (2013.01); *H04L 5/0091* (2013.01); *H04L 5/0092* (2013.01);
(Continued)

(58) Field of Classification Search
CPC .............................. H04L 5/0053; H04W 72/04
See application file for complete search history.

(56) References Cited

U.S. PATENT DOCUMENTS 8,761,109 B2 * 6/2014 Nory et al. ................... 370/329
2010/0273485 A1 * 10/2010 Huang et al. .............. 455/435.3
(Continued)

FOREIGN PATENT DOCUMENTS

EP  2244512 A1 * 10/2010  ............. H04W 4/22
WO  2009054673 A2   4/2009
(Continued)

OTHER PUBLICATIONS

Unknown, Author, "Common search space design for ePDCCH", Sharp, 3GPP TSG RAN WG1 Meeting #68, R1-120280, Dresden, Germany, Feb. 6-10, 2012, 1-3.
Unknown, Author, "Consideration of reference signals on NCT for potential use case of Rel-12 EPDCCH", Fujitsu, 3GPP TSG-RAN WG1 Meeting #72, R1-130168, St. Julians, Malta, Jan. 28-Feb. 1, 2013, 1-2.
(Continued)

Primary Examiner — Hashim Bhatti
(74) Attorney, Agent, or Firm — Murphy, Bilak & Homiller, PLLC

(57) ABSTRACT

Methods are disclosed for supporting transmission of broadcast messages using multiple types of control channels. An example method begins with receiving (1110) a message from each of several user terminals, each message indicating whether the corresponding user terminal supports the receipt of broadcast messages via the second control channel type. In some embodiments, one or more of these messages may indicate that the corresponding user terminal monitors only the second control channel type for broadcast messages. The control node subsequently initiates (1120) a transmission of a broadcast message to one of the user terminals from one or more base stations in a tracking area for the user terminal. This initiation includes indicating to the one or more base stations whether user terminal supports the receipt of broadcast messages via the second control channel type, based on information earlier received by the control node.

20 Claims, 10 Drawing Sheets

(52) U.S. Cl.
CPC .............. *H04W 68/02* (2013.01); *H04L 5/001* (2013.01); *H04L 5/0023* (2013.01); *H04L 5/0089* (2013.01)

(56) References Cited

U.S. PATENT DOCUMENTS

| | | | | |
|---|---|---|---|---|
| 2011/0014912 | A1* | 1/2011 | Ahluwalia et al. | 455/435.1 |
| 2013/0039232 | A1* | 2/2013 | Kim et al. | 370/280 |
| 2013/0163553 | A1* | 6/2013 | Lee et al. | 370/329 |
| 2013/0301542 | A1* | 11/2013 | Krishnamurthy et al. | 370/329 |
| 2013/0301608 | A1* | 11/2013 | Frenne et al. | 370/331 |
| 2014/0029577 | A1* | 1/2014 | Dinan | 370/331 |
| 2014/0036747 | A1* | 2/2014 | Nory et al. | 370/311 |
| 2014/0044084 | A1* | 2/2014 | Lee et al. | 370/329 |
| 2014/0161007 | A1* | 6/2014 | Donthi et al. | 370/311 |

FOREIGN PATENT DOCUMENTS

| | | | | |
|---|---|---|---|---|
| WO | WO 2009054673 | A2 * | 4/2009 | H04W 52/02 |
| WO | 2011087408 | A1 | 7/2011 | |
| WO | 2011137383 | A1 | 11/2011 | |
| WO | 2012109542 | A1 | 8/2012 | |
| WO | 2012147639 | A1 | 11/2012 | |
| WO | 2012148076 | A1 | 11/2012 | |
| WO | 2013085451 | A1 | 6/2013 | |
| WO | 2013142222 | A1 | 9/2013 | |

OTHER PUBLICATIONS

Unknown, Author, "Search space for enhanced control channels", Ericsson, ST-Ericsson, 3GPP TSG-RAN WG1 #67, R1-113680, Ericsson, San Francisco, CA, Nov. 14-18, 2011, 1-3.

* cited by examiner

PAGING PROCEDURES USING AN ENHANCED CONTROL CHANNEL

TECHNICAL FIELD

The present disclosure is generally related to wireless communication networks, and is more particularly related to the use of enhanced control channel structures for paging messages.

BACKGROUND

The 3$^{rd}$-Generation Partnership Project (3GPP) has developed a third-generation wireless communications known as Long Term Evolution (LTE) technology, as documented in the specifications for the Evolved Universal Terrestrial Radio Access Network (UTRAN). LTE is a mobile broadband wireless communication technology in which transmissions from base stations (referred to as eNodeBs or eNBs in 3GPP documentation) to user terminals (referred to as user equipment, or UEs, in 3GPP documentation) are sent using orthogonal frequency division multiplexing (OFDM). OFDM splits the transmitted signal into multiple parallel sub-carriers in frequency.

More specifically, LTE uses OFDM in the downlink and Discrete Fourier Transform (DFT)-spread OFDM in the uplink. The basic LTE downlink physical resource can be viewed as a time-frequency resource grid. FIG. 1 illustrates a portion of the available spectrum of an exemplary OFDM time-frequency resource grid 50 for LTE. Generally speaking, the time-frequency resource grid 50 is divided into one millisecond subframes. As shown in FIG. 3, each subframe includes a number of OFDM symbols. For a normal cyclic prefix (CP) length, which is suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency resource grid 50 is a resource element. A resource element consists of one OFDM subcarrier during one OFDM symbol interval.

LTE resource elements are grouped into resource blocks (RBs), each of which in its most common configuration consists of twelve subcarriers and seven OFDM symbols (one slot). Thus, a RB typically consists of 84 REs. The two RBs occupying the same set of twelve subcarriers in a given radio subframe (two slots) are referred to as an RB pair, which includes 168 resource elements if a normal CP is used. Thus, an LTE radio subframe is composed of multiple RB pairs in frequency with the number of RB pairs determining the bandwidth of the signal. In the time domain, LTE downlink transmissions are organized into radio frames of 10 ms, each radio frame consisting of ten equally-sized subframes of length $T_{subframe}$=1 ms. This is shown in FIG. 2.

The signal transmitted by an eNB to one or more UEs may be transmitted from multiple antennas. Likewise, the signal may be received at a UE that has multiple antennas. The radio channel between the eNB distorts the signals transmitted from the multiple antenna ports. To successfully demodulate downlink transmissions, the UE relies on reference symbols (RS) that are transmitted on the downlink. Several of these reference symbols are illustrated in the resource grid 50 shown in FIG. 3. These reference symbols and their position in the time-frequency resource grid are known to the UE and hence can be used to determine channel estimates by measuring the effect of the radio channel on these symbols.

The notion of virtual resource blocks (VRB) and physical resource blocks (PRB) has been introduced in LTE. The actual resource allocation to a UE is made in terms of VRB pairs. There are two types of resource allocations, localized and distributed. In a localized resource allocation, a VRB pair is directly mapped to a PRB pair, hence two consecutive and localized VRB are also placed as consecutive PRBs in the frequency domain. On the other hand, distributed VRBs are not mapped to consecutive PRBs in the frequency domain, thus providing frequency diversity for data channel transmitted using these distributed VRBs.

Messages transmitted over the radio link to users can be broadly classified as control messages or data messages. Control messages are used to facilitate the proper operation of the system as well as proper operation of each UE within the system. Control messages include commands to control functions such as the transmitted power from a UE, signaling to identify RBs within which data is to be received by the UE or transmitted from the UE, and so on.

Specific allocations of time-frequency resources in the LTE signal to system functions are referred to as physical channels. For example, the physical downlink control channel (PDCCH) is a physical channel used to carry scheduling information and power control messages. The physical HARQ indicator channel (PHICH) carries ACK/NACK in response to a previous uplink transmission, and the physical broadcast channel (PBCH) carries system information. The primary and secondary synchronization signals (PSS/SSS) can also be seen as control signals, and have fixed locations and periodicity in time and frequency so that UEs that initially access the network can find them and synchronize. Similarly, the PBCH has a fixed location relative to the primary and secondary synchronization signals (PSS/SSS). The UE can thus receive the system information transmitted in BCH and use that system information to locate and demodulate/decode the PDCCH, which carries control information specific to the UE.

As of Release 10 of the LTE specifications, all control messages to UEs are demodulated using channel estimates derived from the common reference signals (CRS). This allows the control messages to have a cell-wide coverage, to reach all UEs in the cell without the eNB having any particular knowledge about the UEs' positions. Exceptions to this general approach are the PSS and SSS, which are stand-alone signals and do not require reception of CRS before demodulation. The first one to four OFDM symbols of the subframe are reserved to carry such control information. The example shown in FIG. 3 has a control region of three OFDM symbols. The actual number of OFDM symbols reserved to the control region may vary, depending on the configuration of each cell. The particular number n=1,2,3 or 4 for a given cell is known as the Control Format Indicator (CFI), and is indicated by the physical CFI channel (PCHICH), which is transmitted in the first symbol of the control region.

Downlink transmissions in LTE are dynamically scheduled, meaning that in each subframe the base station transmits control information about which terminals data is transmitted to and upon which resource blocks the data is transmitted, for the current downlink subframe. The dynamic scheduling information is communicated to the user equipments (UEs) via the PDCCH, which is transmitted in the control region. After successful decoding of a PDCCH, the UE performs reception of the Physical Downlink Shared Channel (PDSCH) or transmission of the Physical Uplink Shared Channel (PUSCH) according to predetermined timing specified in the LTE specs. In addition to the PDCCH, the control region in the downlink signal from the base station also contains the Physical HARQ Indication Channels (PHICH), which carry hybrid-ARQ acknowledgements (ACK/NACK) corresponding to uplink transmissions from the UEs served by the base station.

LTE uses hybrid-ARQ (HARQ), where, after receiving downlink data in a subframe, the terminal attempts to decode it and reports to the base station whether the decoding was successful (ACK) or not (NACK) via the Physical Uplink Control CHannel (PUCCH). In case of an unsuccessful decoding attempt, the base station can retransmit the erroneous data. Similarly, the base station can indicate to the UE whether the decoding of the PUSCH was successful (ACK) or not (NACK) via the Physical Hybrid ARQ Indicator CHannel (PHICH).

The downlink Layer 1/Layer 2 (L1/L2) control signaling transmitted in the control region thus consists of the following different physical-channel types:

The Physical Control Format Indicator Channel (PCFICH), informing the terminal about the size of the control region (one, two, or three OFDM symbols). There is one and only one PCFICH on each component carrier or, equivalently, in each cell.

The Physical Downlink Control Channel (PDCCH), used to signal downlink scheduling assignments and uplink scheduling grants. Each PDCCH typically carries signaling for a single terminal, but can also be used to address a group of terminals. Multiple PDCCHs can exist in each cell.

The Physical Hybrid-ARQ Indicator Channel (PHICH), used to signal hybrid-ARQ acknowledgements in response to uplink UL-SCH transmissions. Multiple PHICHs can exist in each cell.

The PDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH carries one DCI message with one of the formats above. Since multiple terminals can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

Control messages can be categorized into messages that need to be sent only to one UE (UE-specific control) and those that need to be sent to all UEs or some subset of UEs (common control) within the cell being covered by the eNB. Messages of the first type, UE-specific control messages, are typically sent using the PDCCH.

Control messages of PDCCH type are demodulated using CRS and transmitted in multiples of units called control channel elements (CCEs) where each CCE contains 36 REs. A PDCCH message may have an aggregation level (AL) of one, two, four, or eight CCEs. This allows for link adaptation of the control message. Each CCE is mapped to nine resource element groups (REGs) consisting of four RE each. The REGs for a given CCE are distributed over the system bandwidth to provide frequency diversity for a CCE. This is illustrated in FIG. 4. Hence, a PDCCH message can consist of up to eight CCEs, spanning the entire system bandwidth in the first one to four OFDM symbols, depending on the configuration.

Processing of a PDCCH message in an eNB begins with channel coding, scrambling, modulation, and interleaving of the control information. The modulated symbols are then mapped to the resource elements in the control region. As mentioned above, control channel elements (CCE) have been defined, where each CCE maps to 36 resource elements. By choosing the aggregation level, link-adaptation of the PDCCH is obtained. In total there are $N_{CCE}$ CCEs available for all the PDCCH to be transmitted in the subframe; the number $N_{CCE}$ may vary from subframe to subframe, depending on the number of control symbols n and the number of configured PHICH resources.

Since $N_{CCE}$ can vary from subframe to subframe, the receiving terminal must blindly determine the position of the CCEs for a particular PDCCH as well as the number of CCEs used for the PDCCH. With no constraints, this could be a computationally intensive decoding task. Therefore, some restrictions on the number of possible blind decodings a terminal needs to attempt have been introduced, as of Release 8 of the LTE specifications. One constraint is that the CCEs are numbered and CCE aggregation levels of size K can only start on CCE numbers evenly divisible by K. For example, an AL-8 PDCCH message, made up of eight CCEs, can only begin on CCEs numbered 0, 8, 16, and so on.

The LTE Paging Procedure

In LTE networks, a UE is in a RRC_CONNECTED mode or state when a Radio Resource Control (RRC) connection has been established between the UE and the network. Otherwise, the UE is in an RRC_IDLE mode or state. The LTE network uses a paging process to initiate access to a terminal when the UE is in RRC_IDLE mode. Details corresponding to a paging message are scheduled with a DCI message in the common search space, with the Cyclic Redundancy Check (CRC) field of the DCI message scrambled with a P-RNTI. The DCI message points to a corresponding message that is sent on PDSCH. For the purposes of this disclosure, the term "paging message" refers to the control channel message that alerts the UE to the existence of a page. The data carried by the PDSCH and pointed to by the paging message is referred to herein as the "paging message details."

When the UE is in RRC_IDLE mode, the cell in which the UE is located is generally not known by the network. Therefore the paging message is typically transmitted in each of several cells. These several cells form an entity that is called a tracking area. The tracking area is controlled by the Mobility Management Entity (MME), which keeps track of which tracking area the UE belongs to. The MME is able to do this since the UE reports to the MME whenever it enters a new tracking area.

Paging messages targeted to a given terminal are scheduled for transmission in scheduling occasions that occur in a very sparse manner in time. This approach allows the terminal to be in Discontinuous Receive (DRX) state as much as possible, to save battery power. The subframe in which the terminal wakes up and monitors paging messages is given by a formula that takes into account the identity of the terminal, a cell-specific paging cycle and, optionally, a UE-specific paging cycle.

PDCCH Monitoring

LTE defines so-called search spaces, which define the set of CCEs the terminal is supposed to monitor for scheduling assignments/grants relating to a certain component carrier. A search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the Cyclic Redundancy Check (CRC) checks, the content of the control channel is declared as valid for this terminal and the terminal processes the information (scheduling assignment, scheduling grants, etc.). Each terminal in the system therefore has a terminal-specific search space at each aggregation level. These terminal-specific search spaces are collectively called the UE-specific search space (USS).

In several situations, there is a need to address a group of, or all, terminals in the system. To allow all terminals to be addressed at the same time, LTE has defined common search spaces in addition to the terminal-specific search spaces. Again, while there is a common search space for each aggregation level, these are often collectively referred to as the common search space (CSS). The common search space is, as the name implies, common, and all terminals in the cell monitor the CCEs in the common search spaces for control information. Although the motivation for the common search space is primarily transmission of various system messages, it can be used to schedule individual terminals as well. Thus, it can be used to resolve situations where scheduling of one terminal is blocked due to lack of available resources in the terminal-specific search space. More importantly, the common search space is not dependent on UE configuration status. Therefore, the common search space can be used when the network needs to communicate with the UE during UE reconfiguration periods.

A UE thus monitors a common search space and a UE-specific search space in the PDCCH. In each of these search spaces, a limited number of candidates (equivalently, PDCCH transmission hypotheses) are checked, in every downlink subframe for which the UE is in RRC_CONNECTED mode and in a non-DRX interval. For a UE in RRC_IDLE mode, the UE monitors the common search space at least for each paging subframe that is part of the paging cycle. These hypotheses are known as blind decodes, and the UE checks whether any of the transmitted DCI messages is intended for it. The UE knows that the downlink control information is intended for it if the scrambling mask of the CRC of the control message is identical to the expected RNTI of the message. For instance, if a paging message is expected in a subframe, the UE searches the transmitted control channels in that subframe for a message with CRC scrambled with the paging-RNTI (P-RNTI). The UE also monitors other RNTI, such as C-RNTI for scheduling of the shared data channel or the SI-RNTI for scheduling of system information.

The Enhanced PDCCH (ePDCCH)

As of Release 11 of the LTE specifications, UE-specific transmission of control information in the form of enhanced control channels has been introduced. This is done by allowing the transmission of control messages to a UE where the transmissions are placed in the data region of the LTE subframe and are based on UE-specific reference signals. Depending on the type of control message, the enhanced control channels formed in this manner are referred to as the enhanced PDCCH (ePDCCH), enhanced PHICH (ePHICH), and so on.

For the enhanced control channel in Release 11, it has been further agreed to use antenna port $p \in \{107,108,109,110\}$ for demodulation, which correspond with respect to reference symbol positions and set of sequences to antenna ports $p \in \{7,8,9,10\}$, i.e., the same antenna ports that are used for data transmissions on the Physical Data Shared Channel (PDSCH), using UE-specific RS. This enhancement means that the precoding gains already available for data transmissions can be achieved for the control channels as well. Another benefit is that different physical RB pairs (PRB pairs) for enhanced control channels can be allocated to different cells or to different transmission points within a cell. This can be seen in FIG. 5, which illustrates ten RB pairs, three of which are allocated to three separate ePDCCH regions comprising one PRB pair each. Note that the remaining RB pairs can be used for PDSCH transmissions. The ability to allocate different PRB pairs to different cells or different transmission points facilitates inter-cell or inter-point interference coordination for control channels. This is especially useful for heterogeneous network scenarios.

FIG. 6 shows an ePDCCH that is divided into multiple groups and mapped to an enhanced control region. This represents a "localized" transmission of the ePDCCH, since all of the groups making up the ePDCCH message are grouped together in frequency. In most cases, the groups making up an ePDCCH message are grouped within a single PRB pair, although the largest ePDCCH messages require two PRB pairs.

Note that these multiple groups are similar to the CCEs in the PDCCH. Also note that, as seen in FIG. 6, the enhanced control region does not start at OFDM symbol zero. This is to accommodate the simultaneous transmission of a PDCCH in the subframe. However, there may be carrier types in future LTE releases that do not have a PDCCH at all, in which case the enhanced control region could start from OFDM symbol zero within the subframe.

While the localized transmission of ePDCCH illustrated in FIG. 6 enables UE-specific precoding, which is an advantage over the conventional PDCCH, in some cases it may be useful to be able to transmit an enhanced control channel in a broadcasted, wide area coverage fashion. The frequency diversity provided by this approach is particularly useful if the eNB does not have reliable information to perform precoding towards a certain UE, in which case a wide area coverage transmission may be more robust. Another case where distributed transmission may be useful is when the particular control message is intended for more than one UE, since in this case UE-specific precoding cannot be used. This is the general approach taken for transmission of the common control information using PDCCH.

Accordingly, a distributed transmission over enhanced control regions can be used, instead of the localized transmission shown in FIG. 6. An example of distributed transmission of the ePDCCH is shown in FIG. 7, where the four parts belonging to the same ePDCCH are distributed over the enhanced control regions. 3GPP has agreed that both localized and distributed transmission of an ePDCCH should be supported, these two approaches corresponding generally to FIGS. 6 and 7, respectively. Common control channel transmission using the ePDCCH will be further specified in Release 12 of the 3GPP specifications for LTE.

SUMMARY

When a UE is in RRC_IDLE state, the UE is synchronized to a cell. However, the network does not know to which cell, since in RRC_IDLE state the UE is not connected to the network using any cell. When the network transmits a paging message to page a UE in RRC_IDLE state, the network may not be able to distinguish whether the UE monitors the paging RNTI (P-RNTI) in ePDCCH or in the PDCCH. Furthermore, paging procedures involving ePDCCH are currently not defined. Several embodiments of the techniques and apparatus disclosed herein address these problems.

In several of these embodiments, a UE indicates to the network whether it is capable of monitoring P-RNTI in the ePDCCH. Alternative embodiments are also disclosed, where it is assumed that the network is not aware of whether the UE is capable of monitoring the ePDCCH at all, or whether it is capable of monitoring CSS in ePDCCH or only USS in ePDCCH.

Some methods for supporting transmission of broadcast messages as described herein are suitable for implementation in a control node in a radio communications network that includes one or more base stations that support the transmission of broadcast messages using either or both of a first type of control channel type (e.g., a PDCCH) and a second type of control channel (e.g., an ePDCCH or other enhanced control channel type), as well as one or more base stations that support transmission of broadcast messages using only the first control channel type.

An example of such methods begins with the reception of a message from each of several user terminals (e.g., LTE UEs), each message indicating whether the corresponding user terminal supports the receipt of broadcast messages via the second control channel type. In some embodiments, one or more of these messages may indicate that the corresponding user terminal monitors only the second control channel type for broadcast messages. The control node subsequently initiates a transmission of a broadcast message to one of the user terminals from one or more base stations in a tracking area for the user terminal. This initiation includes indicating to the one or more base stations whether user terminal supports the receipt of broadcast messages via the second control channel type, based on information earlier received by the control node. This technique may be repeated indefinitely, as user terminals move in and out of tracking areas and as the need to page user terminals arises.

The technique summarized is generally applicable to broadcast messages, but is particularly applicable to paging messages. The control node may be a mobility management entity (MME) in an LTE network, in some embodiments, in which case the initiating of the paging message transmission may be carried out via an S1 protocol defined by specifications for LTE. The messages from UEs indicating whether those UEs support paging messages via the second control channel type may be received in conjunction with tracking area updates from the user terminals, in some embodiments, or separately, in others. When the technique summarized above is applied to an LTE network, the first control channel type may be a Physical Downlink Control Channel (PDCCH), while the second control channel type is an enhanced Physical Downlink Control Channel (ePDCCH). The technique is more generally applicable, however. In some cases, the first control channel type utilizes time-frequency resources distributed across substantially all of the downlink frequency bandwidth utilized by each base station, while the second control channel type utilizes time-frequency resources in one or more frequency-localized portions of the downlink frequency bandwidth utilized by each base station.

Other methods disclosed herein are suitable for implementation in a base station configured to support transmission of broadcast messages using either or both of a first control channel type and a second control channel type. An example begins with the transmitting of a broadcast message to user terminals, the broadcast message indicating that the base station is configured to support transmission of broadcast information via the second control channel type. In some embodiments, the broadcast message may further include one or more parameters for use by user terminals in receiving broadcast information via the second control channel type, such as parameters indicating where time-frequency resources for the second control channel type may be found, parameters indicating a coding technique, scrambling initiation parameters, or the like. This example method continues with the receiving, from a control node, of a paging initiation message for each of a plurality of user terminals. The base station also receives, for each user terminal, an indication of whether the corresponding user terminal supports the receipt of broadcast messages via the second control channel type. In some embodiments, the indication of whether a user terminal supports the receipt of broadcast messages via the second control channel type is received as part of or along with the paging initiation message, but it may be received separately in other embodiments. In the latter case, the indication of whether a user terminal supports the receipt of broadcast messages via the second control channel type may be received from a node other than the control node that sends the paging initiation messages.

The base station transmits a paging message to each of the user terminals, in response to the paging initiation messages. For each transmission, the base station selectively uses the first control channel type or the second control channel type, based on whether the targeted user terminal supports the receipt of broadcast messages via the second control channel type. In some, but not all embodiments, the base station is configured to carry out a different procedure for user terminals for which the base station has not received an indication of whether the user terminal supports the receipt of broadcast messages via the second control channel type. Thus, the base station receives, from the control node, a paging initiation message for each of one or more additional user terminals, without receiving a corresponding indication of whether the corresponding user terminal supports the receipt of broadcast messages via the second control channel type. The base station simultaneously transmits first and second paging messages to each of these one or more additional user terminals, using the first control channel type and the second control channel type, respectively.

In some embodiments, the base station's choice of the first control channel type or the second control channel type may depend on the state of the targeted user terminal, as well as on whether the user terminal supports receiving broadcast messages via the second control channel type. Thus, in some embodiments, for user terminals that support the receipt of broadcast messages via the second control channel type, the base station determines whether each user terminal is operating in Radio Resource Control (RRC) connected state or in RRC idle state. The base station transmits paging messages via the second control channel type to user terminals operating in RRC connected state, and transmits paging messages via the first control channel type to user terminals operating in RRC idle state.

Still others of the methods disclosed herein may be carried out by user terminals that support reception of broadcast messages using either or both of a first control channel type and a second control channel type, such as user terminals configured for operation in radio communications networks like those discussed above. One example begins with the user terminal detecting that it has moved into a new tracking area. The user terminal sends a message to the network, indicating that it supports receipt of broadcast messages via the second control channel type, which may be, for example, an enhanced control channel in an LTE network. In some embodiments, this message may further indicate that the user terminal has moved into the second tracking area. In other embodiments, however, the message may be separate from a tracking area update message. In some embodiments, the message indicates support of the second control channel type by means of a specific capability or a UE category included in the message.

Another procedure, which may be carried out in conjunction with the user terminal method summarized above, begins with the receiving of a broadcast message from a base station, the broadcast message indicating that the base station is configured to support transmission of broadcast information via the second control channel type. The user terminal responds to this broadcast message by monitoring a search space in a control channel of the second control channel type for a paging message. In some embodiments, the user terminal monitors only the search space in the control channel of the second control channel type for a paging message, in response to the broadcast message.

Yet another procedure that may be carried out by user terminals that support reception of broadcast messages using either or both of a first control channel type and a second control channel type includes the monitoring for paging messages via the second control channel type when in a Radio Resource Control (RRC) connected state. The user terminal monitors for paging messages via the first control channel type when in an RRC idle state.

Corresponding apparatus embodiments adapted to carry out these methods, i.e., user equipment/user terminal apparatus, base station (e.g., eNodeB) apparatus, and control node apparatus, follow directly from the above and are described in detail below. Of course, the techniques and apparatus described herein are not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
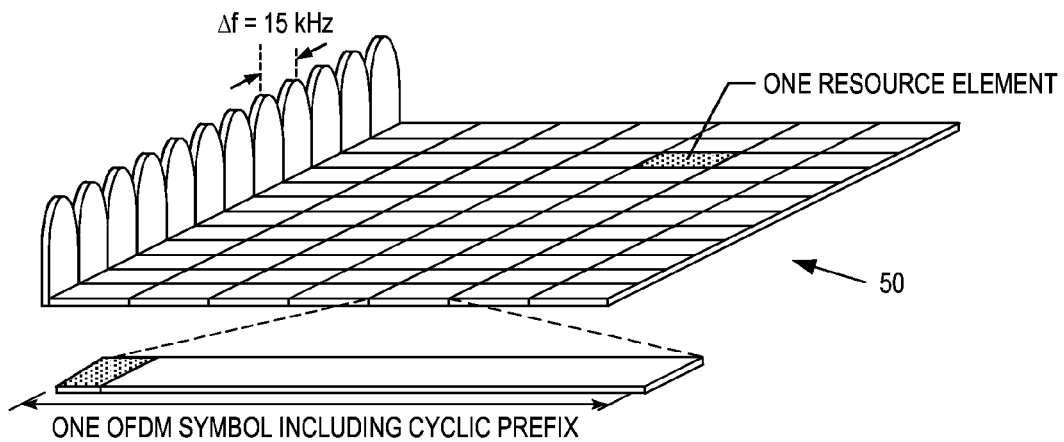
FIG. 1 illustrates the time-frequency resource grid of an OFDM signal.
Figure 2:
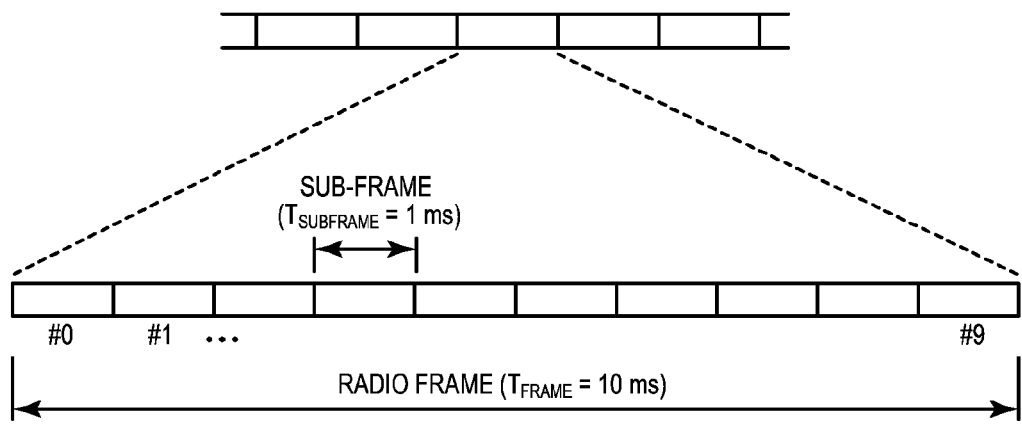
FIG. 2 is a time-domain representation of an LTE radio frame.
Figure 3:
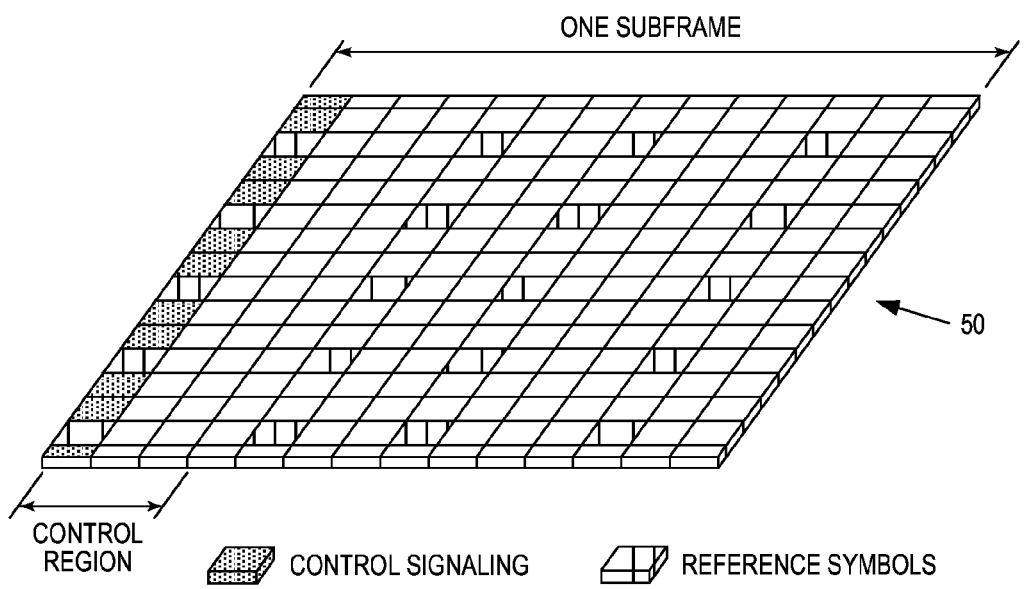
FIG. 3 illustrates details of an example subframe of an LTE signal.
Figure 4:
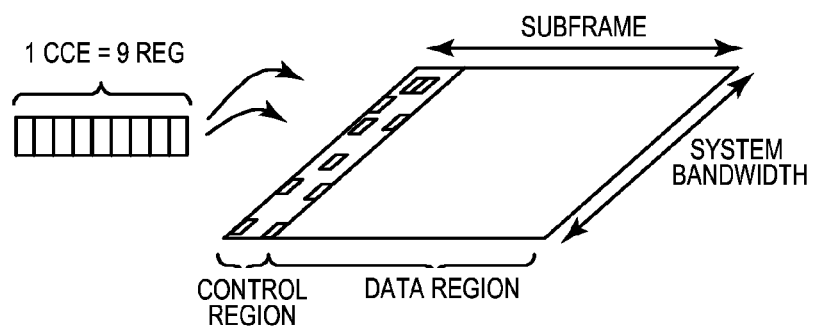
FIG. 4 illustrates the mapping of a CCE to the control region of an LTE subframe.
Figure 5:
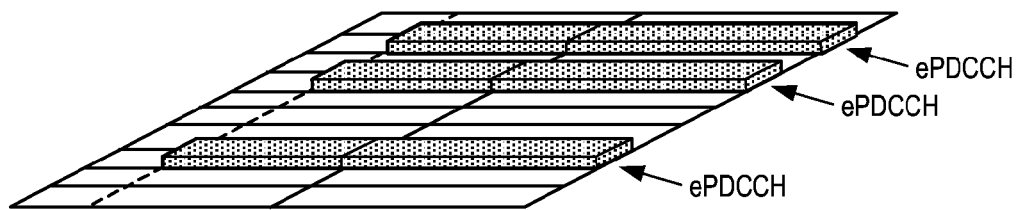
FIG. 5 illustrates the mapping of an example enhanced control channel region to an LTE subframe.
Figure 6:
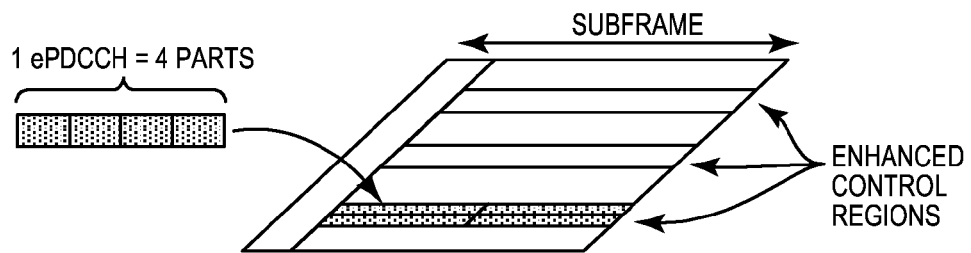
FIG. 6 illustrates the localized mapping of an ePDCCH to an enhanced control region.
Figure 7:
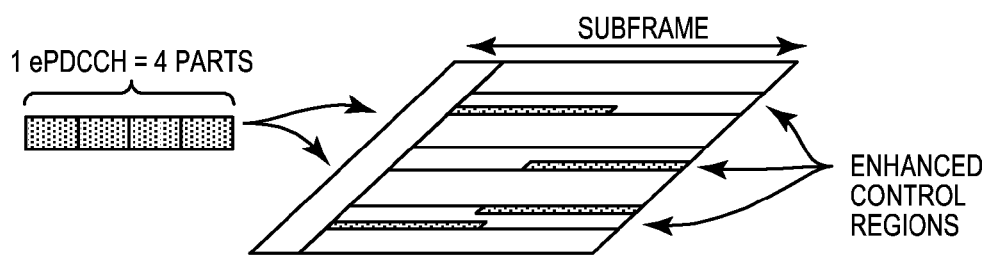
FIG. 7 illustrates the distributed mapping of an ePDCCH to enhanced control regions.
Figure 8:
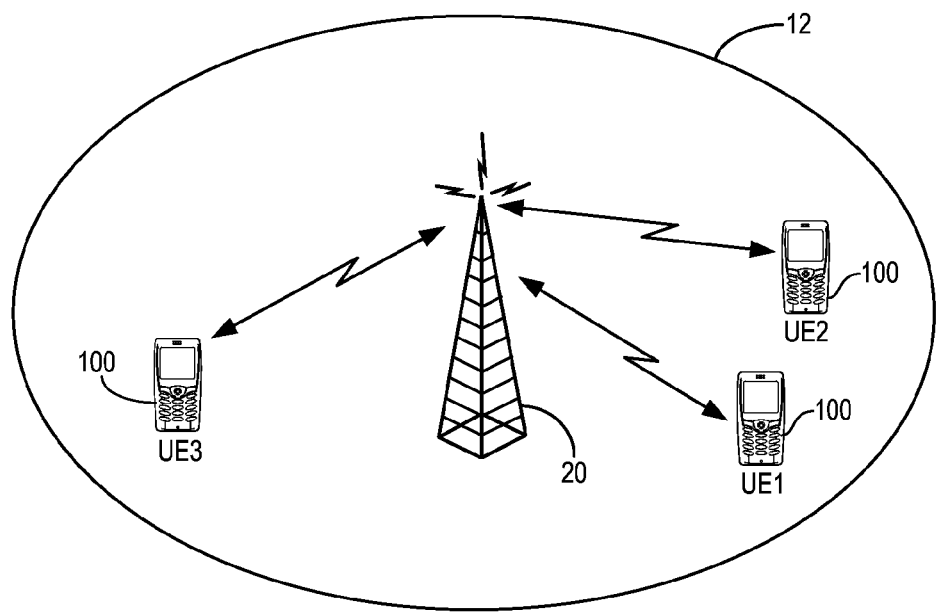
FIG. 8 illustrates an example radio communications network in which several of the presently disclosed techniques may be applied.

Referring now to the drawings, FIG. 8 illustrates an exemplary mobile communication network 10 for providing wireless communication services to user terminals 100. Three user terminals 100, which are referred to as "user equipment" or "UE" in LTE terminology, are shown in FIG. 8. The user terminals 100 may comprise, for example, cellular telephones, personal digital assistants, smart phones, laptop computers, handheld computers, or other devices with wireless communication capabilities. It should be noted that the terms "user terminal," "mobile station," or "mobile terminal," as used herein, refer to a terminal operating in a mobile communication network and do not necessarily imply that the terminal itself is mobile or moveable. Thus, the terms should be understood as interchangeable for the purposes of this disclosure and may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is generally referred to in LTE as an Evolved NodeB (eNodeB or eNB). One base station 20 may provide service in multiple geographic cell areas or sectors 12. The user terminals 100 receive signals from base station 20 on one or more downlink (DL) channels, and transmit signals to the base station 20 on one or more uplink (UL) channels. In particular, the UEs 100, whether in RRC_IDLE mode or RRC_CONNECTED mode, maintain synchronization to the illustrated base station 20, and monitor control channels transmitted by base station 20.

For illustrative purposes, several embodiments will be described in the context of a Long-Term Evolution (LTE) system. Those skilled in the art will appreciate, however, that the presently disclosed techniques may be more generally applicable to other wireless communication systems, including, for example, WiMax (IEEE 802.16) systems.

A UE compliant to Release 11 of the LTE specifications (a Release-11 UE) can monitor a UE-specific search space in the ePDCCH. However, the common search space is always monitored in the PDCCH by these UEs. A Release-12 UE (and later UEs) may be configured to monitor its entire control channel in the ePDCCH, rather than the PDCCH. In this case, both its UE-specific search space (USS) and its common search space (CSS) are monitored in the ePDCCH resources. Alternatively, a Release-12 UE may, like a Release-11 UE, monitor the USS in the ePDCCH and the CSS in PDCCH. Since the paging message is transmitted in the common search space, it can be transmitted in the ePDCCH in the event that the targeted UE is monitoring the CSS on ePDCCH.

Some UE categories expected in the future, such as low-cost machine-type communication UEs (MTC), may not monitor the PDCCH at all. In some cases this may be because they have a reduced, UE-specific reception bandwidth, and thus cannot receive the full system bandwidth necessary for monitoring the PDCCH. Therefore, these UE must always monitor both CSS and USS in the ePDCCH. Hence, the paging channels are always monitored on ePDCCH for such a UE.

For at least these UEs, initial access to a cell must also be performed directly to ePDCCH. UEs that are capable of monitoring either or both of PDCCH and ePDCCH may choose to perform initial access using the ePDCCH if it is available in the cell When a UE is in RRC_IDLE state, the UE is synchronized to a cell. However, the network does not know to which cell, since in RRC_IDLE state the UE is not connected to the network using any cell. A paging area may contain several cells with different signal structures and carrier types. More specifically, some cells may utilize PDCCH solely for paging transmissions, some cells may utilize both PDCCH and ePDCCH for paging transmissions, and yet some other cells may utilize ePDCCH only for paging transmissions. An illustrated example is given in FIG. 9, where a paging area is covered by eNB 1 and eNB2 and where only ePDCCH paging notifications in this example are transmitted from eNB2 and only PDCCH paging transmissions from eNB1.

Furthermore, as discussed above, UEs have different capabilities. A Release-10 (and earlier) UE can only monitor DCI messages in the PDCCH. A Release-11 UE can monitor control channels in both PDCCH and ePDCCH, but in ePDCCH can only monitor the UE-specific search space. A Release-12 UE is capable of monitoring both the CSS and USS in PDCCH and ePDCCH.

Figure 9:
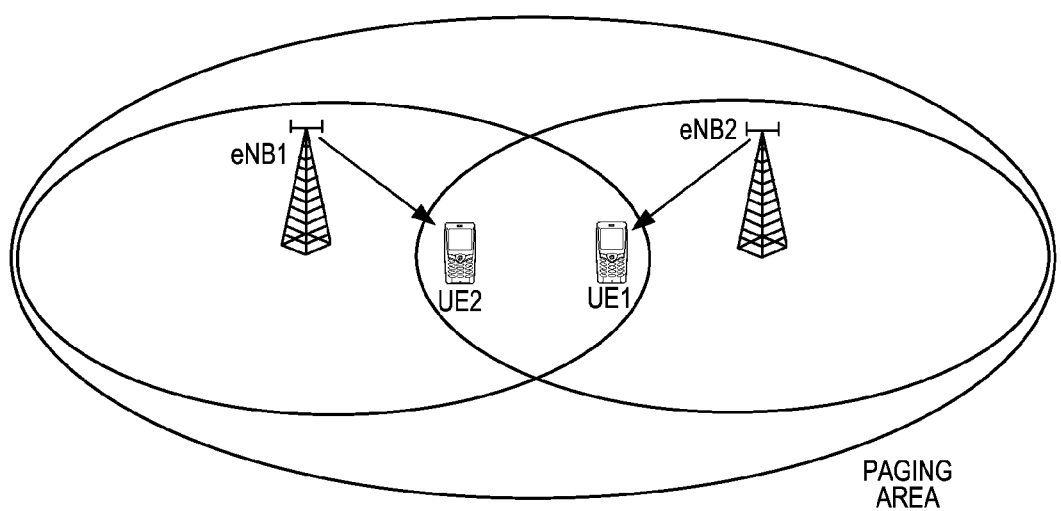
FIG. 9 shows an example of a paging area covered by two base stations.

In the example scenario illustrated in FIG. 9, a paging area is covered by eNB 1 and eNB2, where eNB1 transmits only PDCCH and eNB2 transmits only ePDCCH. In this scenario, UE1 is synchronized to eNB2 and monitors the ePDCCH transmitted from eNB2. However, the network is unaware of this when the UE is in RRC_IDLE state. As can be seen from this scenario, when the network transmits a paging message to page a UE in RRC_IDLE state, the network may not be able to distinguish whether the UE monitors the paging RNTI (P-RNTI) in ePDCCH or in the PDCCH.

Detailed below are methods and apparatus for addressing these problems. In some embodiments, the UE indicates to the network that it is capable of monitoring P-RNTI in the ePDCCH. Alternative embodiments are also described, where it is assumed that the network is not aware of whether the UE is capable of monitoring the ePDCCH at all, or whether it is capable of monitoring CSS in ePDCCH or only USS in ePDCCH.

In a system according to a first embodiment, when the UE updates which tracking area it is associated with, it also reports its support for receiving pages on ePDCCH (or common search space reception on ePDCCH) to the network. For this particular approach, the main aspect is that the UE reports that it supports receiving broadcast information through ePDCCH, or alternatively whether it monitors the whole CSS in ePDCCH. When the UE is in RRC_IDLE state and the network would like to page the UE, then the network node having knowledge of which tracking area(s) the UE is associated with informs the eNBs in those tracking areas to page a certain UE. This network node, which may be an MME, for example, also indicates to the eNBs that the UE supports ePDCCH reception of broadcast information, such as paging messages and system information messages.

One or more of the base stations may also be configured to transmit an indication of whether it delivers paging messages through ePDCCH. Accordingly, a UE operating in RRC_IDLE mode and supporting reception of paging messages through ePDCCH will, when synchronized to a cell that has indicated that it delivers paging message through ePDCCH, only monitor ePDCCH for paging messages. On the other hand, a UE operating in RRC_IDLE mode and supporting reception of paging message through ePDCCH will, when synchronized to a cell that does not indicate that it delivers paging message through ePDCCH, only monitor PDCCH for paging messages.

An eNB that receives a request from a network node to page a specific UE will page the UE using only the ePDCCH if the cell it is operating supports delivery of broadcast messages through ePDCCH and the specific UE monitors paging on ePDCCH. Likewise, an eNB that receives a request from a network node to page a specific UE will page the UE using only the PDCCH if the cell it is operating does not support delivery of broadcast messages or if the UE does not monitor paging on ePDCCH.

In some embodiments, the network node keeping track of which UE is operating in which tracking area is a mobility management entity (MME). The protocol used for communications between the eNB and the MME is the S1 protocol specified by 3GPP standards. The MME may store information indicating each UE's support for ePDCCH reception in the Mobility Management (MM context), along with the UE's current tracking area.

In some embodiments, the broadcasted information indicating whether a given cell supports transmission of broadcast information (e.g., paging) through ePDCCH is given by signaling in a Master Information Block (MIB) or a System Information Block (SIB). The parameters required to receive the CSS, broadcast messages or paging requests on ePDCCH could also be included in MIB and/or a SIB message. Such parameters may include, but are not limited to, the physical location of the PRB pairs for the ePDCCH set containing said message, the antenna ports to use, the demodulation reference signal (DMRS) scrambling initialization or a hash function initialization, where the hash function gives the eCCEs where said message can be found.

A UE configured to monitor the CSS in either PDCCH or ePDCCH will receive the MIB or SIB to determine whether it should monitor broadcast information on PDCCH or ePDCCH when monitoring the control channels of that cell.

In some embodiments of the system described above, the UE indicates support for receiving paging through ePDCCH to the network by indicating a specific capability or by indicating that the UE belongs to a set of UE categories that support paging through ePDCCH.

Figure 10:
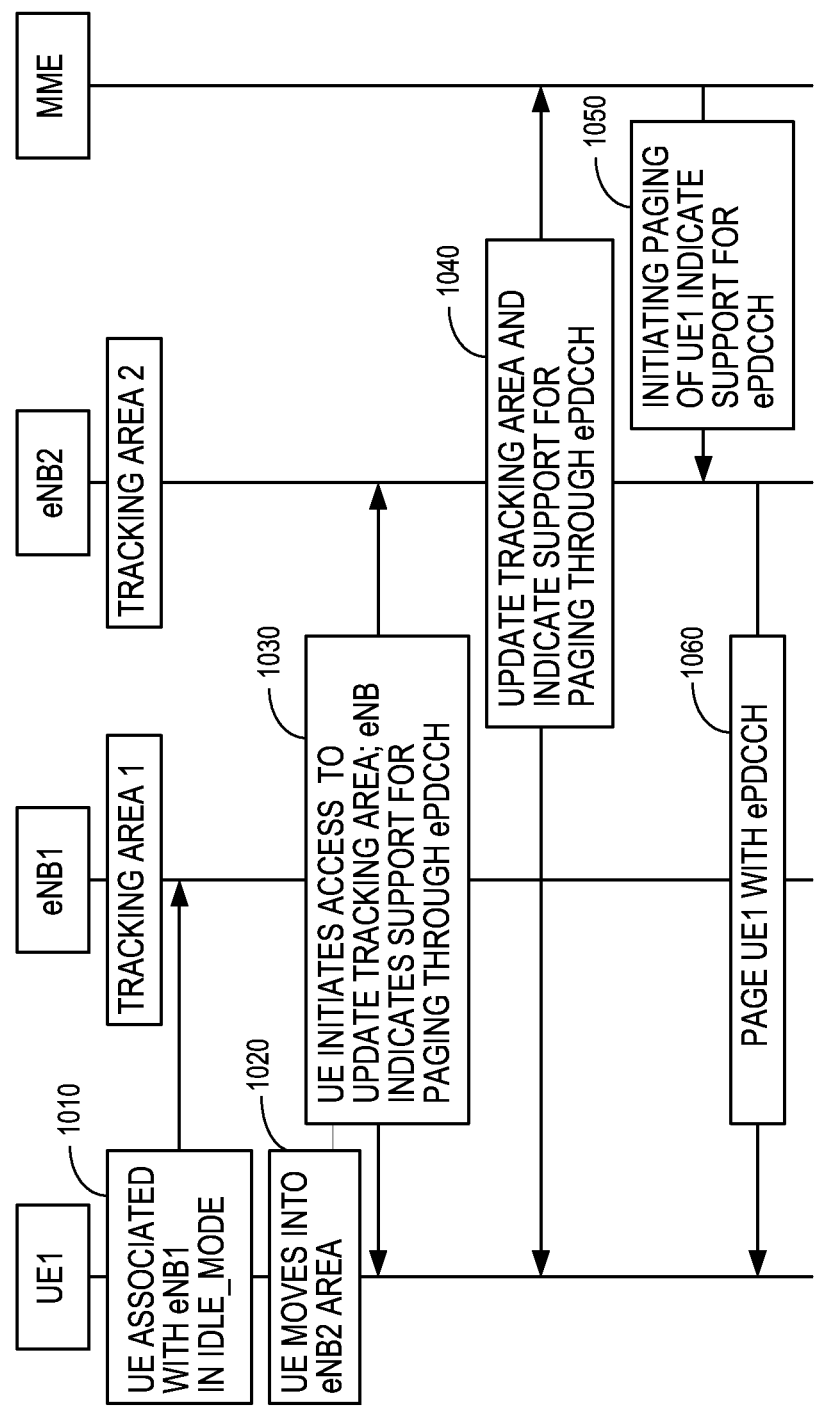
FIG. 10 is a signal flow diagram according to some of the techniques disclosed herein.

FIG. 10 is a signaling flow illustrating one example of the signaling that might occur in a system configured according to the techniques described above. The signaling flow diagram illustrates a scenario involving a single UE, denoted UE1, two base stations, denoted eNB1 and eNB2, and an MME. eNB 1 and eNB2 are in two separate tracking areas, denoted Tracking Area 1 and Tracking Area 2, respectively.

As seen at block 1010, UE1, which is in idle mode, is initially associated with (and thus synchronized to) eNB 1, in Tracking Area 1. It is implicit that UE1 has already sent a report indicating that it had entered Tracking Area 1. This information is tracked by the MME.

As shown at block 1020, UE1 moves into the coverage area of eNB2, which is in Tracking Area 2. As shown at block 1030, UE1 thus initiates access to eNB2 so that it can update its tracking area. eNB2 also indicates its support for paging via ePDCCH, e.g., using a system broadcast message. As shown at block 1040, the UE then updates its tracking area to the MME, and indicates that it can support paging through ePDCCH. Note that while FIG. 10 shows that the UE1 updates its tracking area to the MME (through eNB2), it should be appreciated that it is also possible for eNB2 to provide this update to the MME, i.e, on behalf of UE1. The MME may receive tracking area updates separately from the indication of support for paging through ePDCCH, and may receive the former from an eNB rather than from the UE, in some embodiments.

At some later time, the MME initiates paging of UE1 by sending a message to eNB2 (and any other base stations in Tracking Area 2), as shown at block 1050. This message includes an indication that UE1 supports paging via ePDCCH. As shown at block 1060, eNB2 responds by paging UE1 via the ePDCCH.

An alternative approach to that described generally above is that a UE that supports reception of ePDCCH also, for broadcast purposes, monitors the P-RNTI in ePDCCH in RRC_CONNECTED state but monitors P-RNTI in PDCCH when in RRC_IDLE state. Hence a UE in RRC_IDLE state need not monitor the ePDCCH at all, which has a benefit that it does not need to know the resources reserved for ePDCCH transmission in the cell it is synchronized to. In this embodiment the network node handling which tracking area a UE is associated to does not need to know whether the UE supports ePDCCH or not. In systems adapted to this approach, if an eNB is paging a UE then it will first determine whether the UE is operating in RRC_IDLE or RRC_CONNECTED mode. If the UE is in RRC_CONNECTED mode, then the eNB will page the UE using ePDCCH. Otherwise, it will page the UE using PDCCH.

A further alternative solution is that a UE that supports reception of ePDCCH broadcast information, such as paging messages, monitors paging on ePDCCH, independently of whether it is in RRC_IDLE or RRC_CONNECTED mode. This assumes that the cell the UE is associated with has indicated that it transmits broadcast information (e.g., paging) through ePDCCH. In such a scenario, when an eNB is paging a UE, it will transmit the paging message on both PDCCH and ePDCCH. This approach does not require that the network know whether the UE supports reception of ePDCCH information. Accordingly, the technique of simultaneously transmitting a paging message on both PDCCH and ePDCCH may be combined with any of the other embodiments described above, such that an eNB transmits a paging message on both PDCCH and ePDCCH when it does not know whether or not the targeted UE supports paging reception via the ePDCCH.

When a page is simultaneously transmitted on both PDCCH and ePDCCH, the scheduling assignments in the downlink control information (DCI) transmitted on PDCCH and ePDCCH may indicate the same physical resource, and thus the same PDSCH message for the paging. This approach saves physical scheduling resources in the eNB. Alternatively, the scheduling assignment indicating the page on PDCCH and ePDCCH may indicate different PDSCH resources if, for example the PDSCH contents are different.

In all of the embodiments described above, a paging message is transmitted by the eNB on a cell by transmitting a DCI message on either PDCCH or ePDCCH, or both, with the message's CRC scrambled using a P-RNTI that indicates a scheduling assignment for a PDSCH. Further, the DCI message scrambled with a P-RNTI is transmitted within the common search space on either PDCCH or ePDCCH, or both. Note that a different P-RNTI can be used on each of ePDCCH and PDCCH, in some embodiments.

With the specific examples described above in mind, it should be appreciated that FIG. 11 is a process flow diagram illustrating a generalized method for supporting transmission of broadcast messages. The method illustrated in FIG. 11 is suitable for implementation in a control node in a radio communications network that includes one or more base stations that support the transmission of broadcast messages using either or both of a first type of control channel type (e.g., a PDCCH) and a second type of control channel (e.g., an ePDCCH or other enhanced control channel type), as well as one or more base stations that support transmission of broadcast messages using only the first control channel type.

As shown at block 1110, the illustrated procedure begins with the reception of a message from each of several user terminals (e.g., LTE UEs), each message indicating whether the corresponding user terminal supports the receipt of broadcast messages via the second control channel type. In some embodiments, one or more of these messages may indicate that the corresponding user terminal monitors only the second control channel type for broadcast messages. As shown at block 1120, the control node subsequently initiates a transmission of a broadcast message to one of the user terminals from one or more base stations in a tracking area for the user terminal. This initiation includes indicating to the one or more base stations whether user terminal supports the receipt of broadcast messages via the second control channel type, based on information earlier received by the control node. As indicated in the figure, this technique may be repeated indefinitely, as user terminals move in and out of tracking areas and as the need to page user terminals arises.

Figure 11:
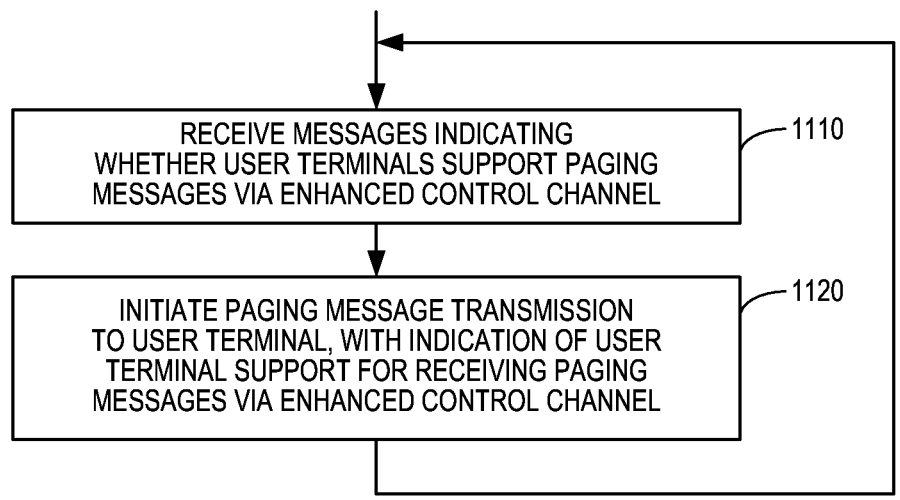
FIG. 11 is a process flow diagram illustrating an example method implemented by a control node in a wireless network.

The technique illustrated in FIG. 11 is shown as applicable to paging messages. It will be appreciated that the technique is more generally applicable to broadcast messages in general, where a paging message is a particular example of a broadcast message. The control node in which the technique of FIG. 11 is implemented may be a mobility management entity (MME) in an LTE network, in which case the initiating of the paging message transmission may be carried out via an S1 protocol defined by specifications for LTE.

It will be further appreciated that the messages from UEs indicating whether those UEs support paging messages via the second control channel type may be received in conjunction with tracking area updates from the user terminals, in some embodiments, or separately, in others.

When the technique illustrated in FIG. 11 is applied to an LTE network, the first control channel type may be a Physical Downlink Control Channel (PDCCH), while the second control channel type is an enhanced Physical Downlink Control Channel (ePDCCH). The technique is more generally applicable, however. In some cases, such as the LTE example given above, the first control channel type utilizes time-frequency resources distributed across substantially all of the downlink frequency bandwidth utilized by each base station, while the second control channel type utilizes time-frequency resources in one or more frequency-localized portions of the downlink frequency bandwidth utilized by each base station.

Figure 12:
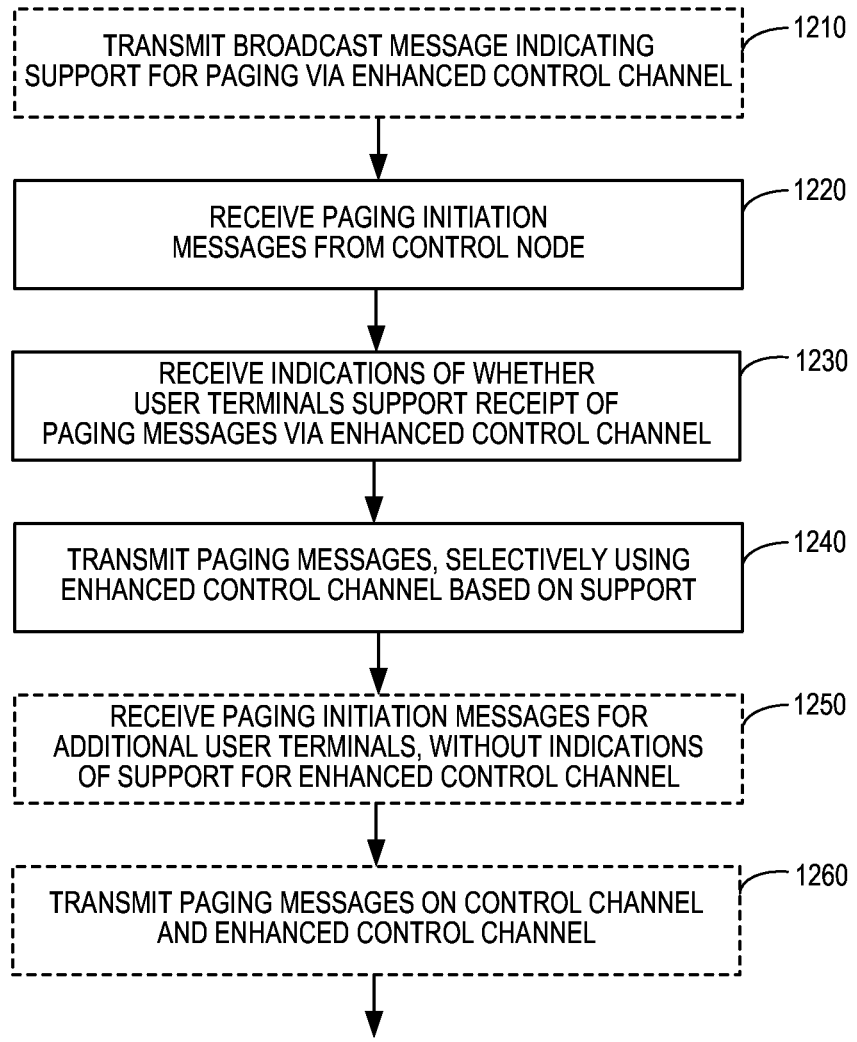
FIGS. 12 and 13 are process flow diagrams illustrating example methods implemented by a base station.

FIG. 12 is a process flow diagram illustrating a method suitable for implementation in a base station configured to support transmission of broadcast messages using either or both of a first control channel type and a second control channel type. It will be appreciated that the process illustrated in FIG. 12, and variants thereof, complement the method illustrated in FIG. 11.

As shown at block 1210, the illustrated method begins with the transmitting of a broadcast message to user terminals, the broadcast message indicating that the base station is configured to support transmission of broadcast information via the second control channel type. Block 1210 is outlined with a dashed line, indicating that this operation is optional, in that it may not be carried out in all embodiments.

Any of a number of known techniques for transmitting broadcast messages may be used to send this indication, when it is used. In some embodiments, the broadcast message may further include one or more parameters for use by user terminals in receiving broadcast information via the second control channel type, such as parameters indicating where time-frequency resources for the second control channel type may be found, parameters indicating a coding technique, scrambling initiation parameters, or the like.

As shown at block 1220, the illustrated method continues with the receiving, from a control node, of a paging initiation message for each of a plurality of user terminals. As shown at block 1230, the base station also receives, for each user terminal, an indication of whether the corresponding user terminal supports the receipt of broadcast messages via the second control channel type. In some embodiments, the indication of whether a user terminal supports the receipt of broadcast messages via the second control channel type is received as part of or along with the paging initiation message, but it may be received separately in other embodiments. In the latter case, the indication of whether a user terminal supports the receipt of broadcast messages via the second control channel type may be received from a node other than the control node that sends the paging initiation messages.

As shown at block 1240, the base station transmits a paging message to each of the user terminals. For each transmission, the base station selectively uses the first control channel type or the second control channel type, based on whether the targeted user terminal supports the receipt of broadcast messages via the second control channel type.

In some, but not all embodiments, the base station is configured to carry out a different procedure for user terminals for which the base station has not received an indication of whether the user terminal supports the receipt of broadcast messages via the second control channel type. As pictured in block 1250, the base station receives, from the control node, a paging initiation message for each of one or more additional user terminals, without receiving a corresponding indication of whether the corresponding user terminal supports the receipt of broadcast messages via the second control channel type. As shown at block 1260, the base station simultaneously transmits first and second paging messages to each of these one or more additional user terminals, using the first control channel type and the second control channel type, respectively. Again, because these operations are not supported in all embodiments, blocks 1250 and 1260 are illustrated with dashed outlines, indicating that these operations are "optional."

In the process illustrated in FIG. 12, the control node that sends the paging initiation messages may be a mobility management entity (MME) in an LTE network, in some embodiments, in which case the paging initiation messages may be received via an S1 protocol defined by specifications for LTE. In these embodiments, the first control channel type may be a Physical Downlink Control Channel (PDCCH), while the second control channel type is an enhanced Physical Downlink Control Channel (ePDCCH). The techniques are more broadly applicable, however. In some, but not all embodiments, such as those implemented in an LTE network, the first control channel type utilizes time-frequency resources distributed across substantially all of the downlink frequency bandwidth utilized by each base station, and wherein the second control channel type utilizes time-frequency resources in one or more frequency-localized portions of the downlink frequency bandwidth utilized by each base station.

Figure 13:
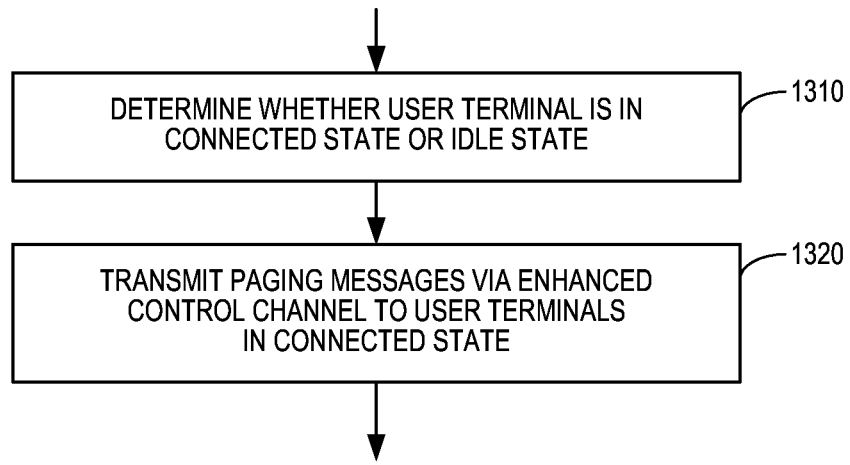

In some systems, the base station's choice of the first control channel type or the second control channel type may depend on the state of the targeted user terminal, as well as on whether the user terminal supports receiving broadcast messages via the second control channel type. An example is shown in FIG. 13, which illustrates operations taken for user terminals that support the receipt of broadcast messages via the second control channel type. It will be appreciated that the operations shown in FIG. 13 may be combined with those shown in FIG. 12.

As shown at block 1310, for user terminals that support the receipt of broadcast messages via the second control channel type, the base station determines whether each user terminal is operating in Radio Resource Control (RRC) connected state or in RRC idle state. As shown in block 1320, the base station transmits paging messages via the second control channel type to user terminals operating in RRC connected state, and transmits paging messages via the first control channel type to user terminals operating in RRC idle state.

Figure 14:
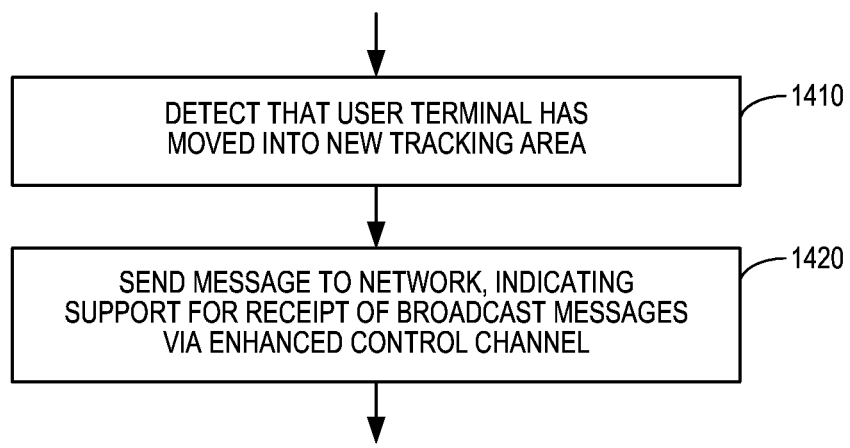
FIGS. 14, 15, and 16 are process flow diagrams illustrating example methods implemented by a user terminal.
Figure 15:
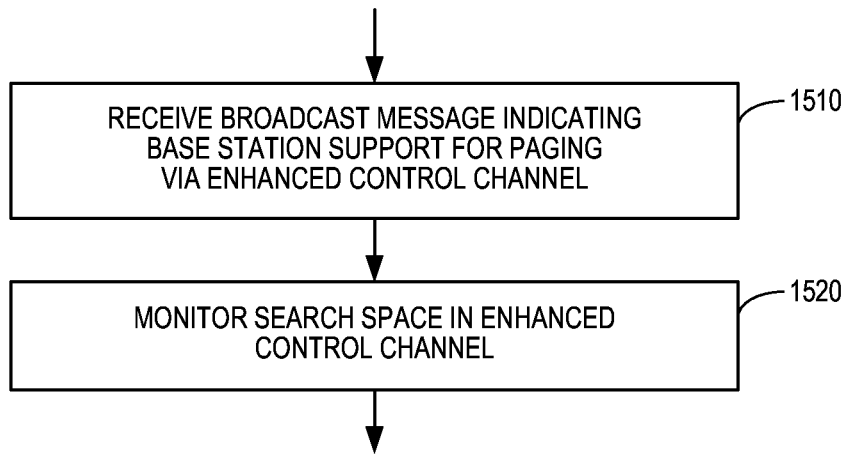
Figure 16:
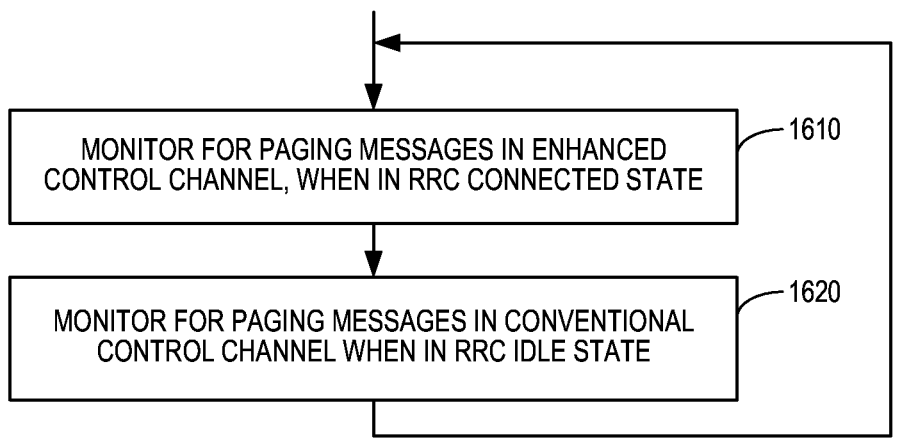

FIGS. 14, 15, and 16 illustrate procedures that may be carried out by user terminals that support reception of broadcast messages using either or both of a first control channel type and a second control channel type, such as user terminals configured for operation in radio communications networks like those discussed above. The process flow in FIG. 14 begins, as shown at block 1410, with the user terminal detecting that it has moved into a new tracking area. It will be appreciated that this operation may be carried out using conventional techniques. As shown at block 1420, the user terminal sends a message to the network, indicating that it supports receipt of broadcast messages via the second control channel type, which may be, for example, an enhanced control channel in an LTE network.

In some embodiments, this message may further indicate that the user terminal has moved into the second tracking area. In other embodiments, however, the message may be separate from a tracking area update message. In some embodiments, the message indicates support of the second control channel type by means of a specific capability or a UE category included in the message.

FIG. 15 illustrates another procedure that may be carried out by user terminals that support reception of broadcast messages using either or both of a first control channel type and a second control channel type. This procedure may be carried out in conjunction with the process illustrated in FIG. 14, in some embodiments.

As shown at block 1510, this procedure begins with the receiving of a broadcast message from a base station, the broadcast message indicating that the base station is configured to support transmission of broadcast information via the second control channel type. As shown at block 1520, the user terminal responds to this broadcast message by monitoring a search space in a control channel of the second control channel type for a paging message. In some embodiments, the user terminal monitors only the search space in the control channel of the second control channel type for a paging message, in response to the broadcast message.

FIG. 16 illustrates yet another procedure that may be carried out by user terminals that support reception of broadcast messages using either or both of a first control channel type and a second control channel type. This procedure may be carried out in conjunction with either or both of the processes illustrated in FIGS. 14 and 15, in some embodiments.

The process illustrated in FIG. 16 includes, as shown at block 1610, the monitoring for paging messages via the second control channel type when in a Radio Resource Control (RRC) connected state. As shown at block 1620, the user terminal monitors for paging messages via the first control channel type when in an RRC idle state.

It will be appreciated that corresponding apparatus embodiments adapted to carry out these methods, i.e., user equipment/user terminal apparatus, base station (e.g., eNodeB) apparatus, and control node apparatus, follow directly from the above. More particularly, it will be appreciated that the functions in the techniques and methods described above may be implemented using electronic data processing circuitry provided in user terminals, base stations, and other nodes in a radio communication network. Each user terminal and base station, of course, also includes suitable radio circuitry for receiving and transmitting radio signals formatted in accordance with known formats and protocols, e.g., LTE formats and protocols.

Figure 17:
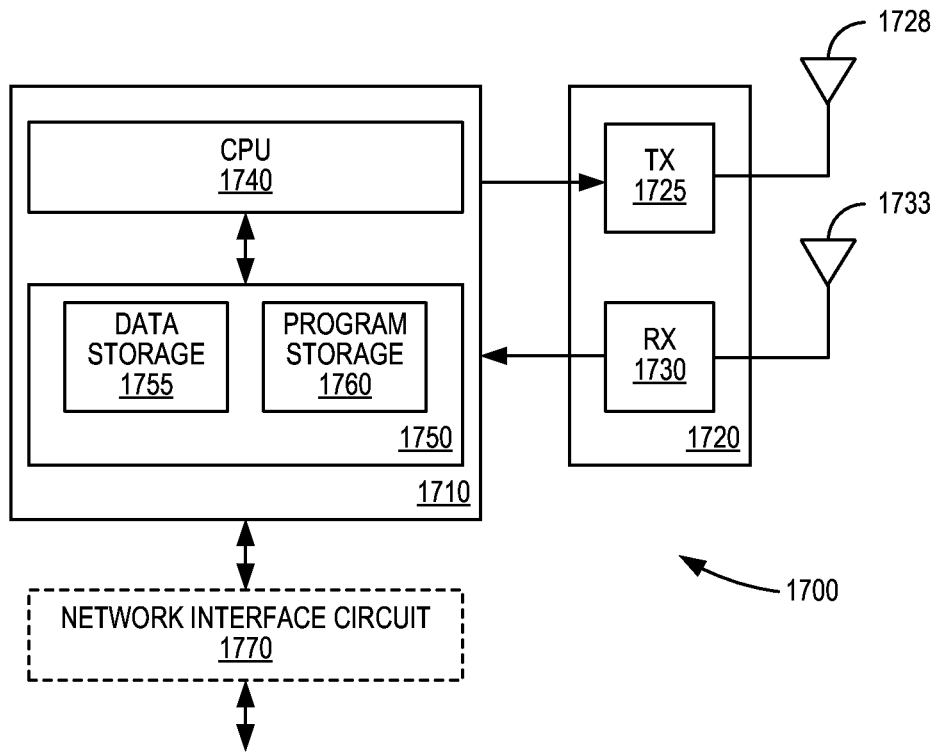
FIG. 17 is a block diagram illustrating components of an example radio node.

FIG. 17 illustrates features of an example communications node 1700 according to several embodiments of the presently disclosed techniques. Although the detailed configuration, as well as features such as physical size, power requirements, etc., will vary, the general characteristics of the elements of communications node 1700 are common to both a wireless base station and a user terminal. Either may be adapted to carry out one or several of the techniques described above for supporting transmission of broadcast messages in a radio communications network.

Communications node 1700 comprises a transceiver 1720 for communicating with mobile terminals (in the case of a base station) or with one or more base stations (in the case of a mobile terminal) as well as a processing circuit 1710 for processing the signals transmitted and received by the transceiver 1720. Transceiver 1720 includes a transmitter 1725 coupled to one or more transmit antennas 1728 and receiver 1730 coupled to one or more receive antennas 1733. The same antenna(s) 1728 and 1733 may be used for both transmission and reception. Receiver 1730 and transmitter 1725 use known radio processing and signal processing components and techniques, typically according to a particular telecommunications standard such as the 3GPP standards for LTE and/or LTE-Advanced. In the event that communications node 1700 is a base station, it may further comprise a network interface circuit 1770, which network interface circuit 1770 is adapted to communicate with other network nodes, such as an MME or other control node, using industry-defined protocols such as the S1 interface defined by 3GPP. Because the various details and engineering trade-offs associated with the design and implementation of transceiver circuitry, processing circuitry, and network interface circuitry are well known and are unnecessary to a full understanding of the presently disclosed techniques and apparatus, additional details are not shown here.

Processing circuit 1710 comprises one or more processors 1740, hardware, firmware or a combination thereof, coupled to one or more memory devices 1750 that make up a data storage memory 1755 and a program storage memory 1760. Memory 1750 may comprise one or several types of memory such as read-only memory (ROM), random-access memory, cache memory, flash memory devices, optical storage devices, etc. Again, because the various details and engineering trade-offs associated with the design of baseband processing circuitry for mobile devices and wireless base stations are well known and are unnecessary to a full understanding of the presently disclosed techniques and apparatus, additional details are not shown here. Typical functions of the processing circuit 1710 include modulation and coding of transmitted signals and the demodulation and decoding of received signals. In several embodiments, processing circuit 1710 is adapted, using suitable program code stored in program storage memory 1760, for example, to carry out one or several of the techniques described above. Of course, it will be appreciated that not all of the steps of these techniques are necessarily performed in a single microprocessor or even in a single module. Thus, embodiments of the presently disclosed techniques include computer program products for application in a user terminal as well as corresponding computer program products for application in a base station apparatus.

Figure 18:
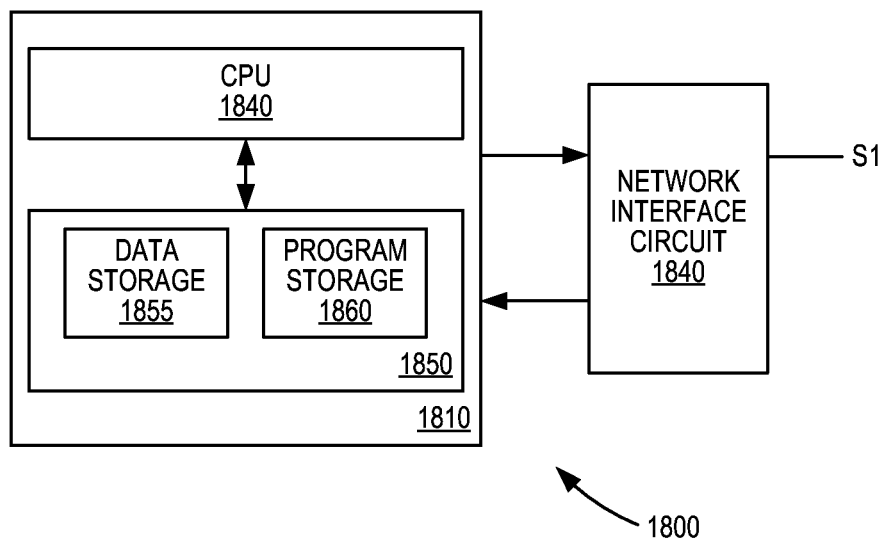
FIG. 18 is a block diagram illustrating components of an example control node.

Similarly, FIG. 18 illustrates features of a control node 1800, adapted to carry out one or more of the techniques described above. Control node 1800 includes a network interface circuit 1840, which is adapted to communicate with other elements of the wireless network, such as one or more eNBs, according to one or more of well-known specifications for network communication. In an LTE context, for example, network interface 1840 is configured to communicate via the S1 interface defined by the LTE specifications. This communication may include, in various embodiments, signaling according to one or more of the techniques described above, to support the transmission of broadcast messages, including paging messages.

Control node 1800, which might be, for example, an LTE MME, includes processing circuitry 1810, which in turn includes a CPU 1840 and memory 1850, which comprises a data storage memory 1855 and a program storage memory 1860. Memory 1850 may comprise one or several types of memory such as read-only memory (ROM), random-access memory, cache memory, flash memory devices, optical storage devices, etc. Again, because the various details and engineering trade-offs associated with the design of processing circuitry for radio network nodes are well known and are unnecessary to a full understanding of the presently disclosed techniques and apparatus, additional details are not shown here.

In several embodiments, processing circuit 1810 is adapted, using suitable program code stored in program storage memory 1860, for example, to carry out one or several of the techniques described above for a control node. Of course, it will be appreciated that not all of the steps of these techniques are necessarily performed in a single microprocessor or even in a single module. Thus, embodiments of the presently disclosed techniques include computer program products for application in a user terminal as well as corresponding computer program products for application in a base station apparatus.

The techniques and apparatus disclosed above can provide a number of advantages, in various embodiments. Some of the techniques described above define procedures for how a UE support ePDCCH paging can be operated in the network. In some cases, these techniques can be used to reduce system overhead, as the network does not need to transmit multiple paging messages. In several embodiments, UE complexity for paging in RRC_IDLE mode is reduced, since the UE only monitors paging either in PDCCH or ePDCCH, but not both. Some of the embodiments described above increase environmental security, since a UE can be reached by public warning messages through paging irrespectively of the release of the UE and of which resource (PDCCH or ePDCCH) is used to monitor the P-RNTI. This may be particularly important for reaching certain categories of machine-type communication terminals with public warning messages, such as sirens or terminals that will further relay the warning messages, as some of these terminals may not have the capability to read the PDCCH at all due to reduced reception bandwidth.

It will be appreciated by the person of skill in the art that various modifications may be made to the above described embodiments without departing from the scope of the presently disclosed techniques and apparatus. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques and apparatus can be implemented in other ways than those specifically set forth herein, without departing from their essential characteristics. The present embodiments are thus to be considered in all respects as illustrative and not restrictive.

With these and other variations and extensions in mind, those skilled in the art will appreciate that the foregoing description and the accompanying drawings represent non-limiting examples of the systems and apparatus taught herein for supporting the transmission of broadcast messages, especially paging messages, in wireless communications networks. As such, the presently disclosed techniques and apparatus are not limited by the foregoing description and accompanying drawings, but are limited only by the following claims and their legal equivalents.

What is claimed is:

1. A method, in a base station configured to support transmission of broadcast messages using either or both of a first type of control channel and a second type of control channel, the method comprising:
   receiving, from a control node, a paging initiation message for each of a plurality of user terminals;
   receiving, from the control node, for each user terminal, an indication of whether the corresponding user terminal supports the receipt of broadcast messages via the second type of control channel;
   for user terminals that support the receipt of broadcast messages via the second type of control channel, determining whether each user terminal is operating in Radio Resource Control (RRC) connected state or in RRC idle state; and
   transmitting a paging message to each of the user terminals, wherein said transmitting comprises selectively using the first type of control channel or the second type of control channel, based on whether the targeted user terminal supports the receipt of broadcast messages via the second type of control channel, and wherein, for user terminals that support the receipt of broadcast messages via the second type of control channel, the paging message is transmitted via the second type of control channel to user terminals operating in RRC connected state and the paging message is transmitted via the first type of control channel to user terminals operating in RRC idle state.

2. The method of claim 1, wherein said indication of whether a user terminal supports the receipt of broadcast messages via the second type of control channel is received as part of or along with the paging initiation message.

3. The method of claim 1, wherein the control node is a mobility management entity in a Long-Term Evolution (LTE) radio communications network, and wherein said paging initiation messages are received via an S1 protocol defined by specifications for LTE.

4. The method of claim 1, wherein the radio communications network is a Long-Term Evolution (LTE) network, the first type of control channel is a Physical Downlink Control Channel (PDCCH) and the second type of control channel is an enhanced Physical Downlink Control Channel (ePDCCH).

5. The method of claim 1, wherein the first type of control channel utilizes time-frequency resources distributed across substantially all of the downlink frequency bandwidth utilized by each base station, and wherein the second type of control channel utilizes time-frequency resources in one or more frequency-localized portions of the downlink frequency bandwidth utilized by each base station.

6. The method of claim 1, further comprising transmitting a broadcast message to user terminals, said broadcast message indicating that the base station is configured to support transmission of broadcast information via the second type of control channel.

7. The method of claim 6, wherein said broadcast message further comprises one or more parameters for use by user terminals in receiving broadcast information via the second type of control channel.

8. The method of claim 1, further comprising, for each of one or more additional terminals:
receiving, from the control node, a paging initiation message for each of one or more additional user terminals, without receiving a corresponding indication of whether the corresponding additional user terminal supports the receipt of broadcast messages via the second type of control channel; and
simultaneously transmitting first and second paging messages to each of the one or more additional user terminals, using the first type of control channel and the second type of control channel, respectively.

9. A method, in a user terminal that supports reception of broadcast messages using either or both of a first type of control channel and a second type of control channel, the method comprising:
detecting that the user terminal has moved from a first tracking area of a radio communications network into a second tracking area;
sending a message to the radio communications network in response to said detecting, the message indicating that the user terminal supports reception of broadcast messages using the second type of control channel;
monitoring for paging messages via the second type of control channel when in a Radio Resource Control (RRC) connected state; and
monitoring for paging messages via the first type of control channel when in an RRC idle state.

10. The method of claim 9, wherein said message further indicates that the user terminal has moved into the second tracking area.

11. The method of claim 9, wherein said message indicates support of the second type of control channel by means of a specific capability or a user terminal category included in the message.

12. A base station apparatus comprising a processing circuit, a radio transceiver adapted to support transmission of broadcast messages using either or both of a first type of control channel and a second type of control channel, and a network interface circuit configured to communicate with a control node, wherein said processing circuit is adapted to:
receive from the control node, via the network interface circuit, a paging initiation message for each of a plurality of user terminals;
receive, from the control node, via the network interface circuit, for each user terminal, an indication of whether the corresponding user terminal supports the receipt of broadcast messages via the second type of control channel;
for user terminals that support the receipt of broadcast messages via the second type of control channel, determine whether each such user terminal is operating in Radio Resource Control (RRC) connected state or in RRC idle state; and
transmit a paging message to each of the user terminals, via the radio transceiver, wherein said transmitting comprises selectively using the first type of control channel or the second type of control channel, based on whether the targeted user terminal supports the receipt of broadcast messages via the second type of control channel, and wherein for user terminals that support the receipt of broadcast messages via the second type of control channel, the paging message is transmitted via the second type of control channel to user terminals operating in RRC connected and the paging message is transmitted via the first type of control channel to user terminals operating in RRC idle state.

13. The base station apparatus of claim 12, wherein said processing circuit is further adapted to transmit a broadcast message to user terminals, said broadcast message indicating that the base station is configured to support transmission of broadcast information via the second type of control channel.

14. The base station apparatus of claim 12, wherein said processing circuit is further adapted to, for each of one or more additional terminals:
receive, via the network interface, a paging initiation message for each of one or more additional user terminals, without receiving a corresponding indication of whether the corresponding user terminal supports the receipt of broadcast messages via the second type of control channel; and
simultaneously transmit first and second paging messages to each of the one or more additional user terminals, using the first type of control channel and the second type of control channel, respectively.

15. A user terminal apparatus comprising a transceiver adapted to support reception of broadcast messages using either or both of a first type of control channel and a second type of control channel, and a processing circuit adapted to:
detect that the user terminal apparatus has moved from a first tracking area of a radio communications network into a second tracking area;
send a message to the radio communications network in response to said detecting, using the transceiver, the message indicating that the user terminal apparatus supports reception of broadcast messages using the second type of control channel;
monitor for paging messages via the second type of control channel when in a Radio Resource Control (RRC) connected state; and
monitor for paging messages via the first type of control channel when in an RRC idle state.

16. The user terminal apparatus of claim 15, wherein said processing circuit is further adapted to:

receive a broadcast message from a base station in said second tracking area, using the transceiver, the broadcast message indicating that the base station is configured to support transmission of broadcast information via the second type of control channel; and monitor a search space in a control channel of the second type of control channel for a paging message, in response to receiving said broadcast message.

17. A method, in a base station configured to support transmission of broadcast messages using either or both of a first type of control channel and a second type of control channel, the method comprising:

receiving, from a control node, a paging initiation message for each of a plurality of user terminals;

receiving, from the control node, for each user terminal, an indication of whether the corresponding user terminal supports the receipt of broadcast messages via the second type of control channel;

transmitting a paging message to each of the user terminals, wherein said transmitting comprises selectively using the first type of control channel or the second type of control channel, based on whether the targeted user terminal supports the receipt of broadcast messages via the second type of control channel;

receiving, from the control node, a paging initiation message for each of one or more additional user terminals, without receiving a corresponding indication of whether the corresponding additional user terminal supports the receipt of broadcast messages via the second type of control channel; and simultaneously transmitting first and second paging messages to each of the one or more additional user terminals, using the first type of control channel and the second type of control channel, respectively.

18. The user terminal of claim 16, wherein only the search space in the control channel of the second type of control channel is monitored for a paging message, in response to receiving said broadcast message.

19. A method, in a user terminal that supports reception of broadcast messages using either or both of a first type of control channel and a second type of control channel, the method comprising:

detecting that the user terminal has moved from a first tracking area of a radio communications network into a second tracking area;

sending a message to the radio communications network in response to said detecting, the message indicating that the user terminal supports reception of broadcast messages using the second type of control channel;

receiving a broadcast message from a base station in said second tracking area, the broadcast message indicating that the base station is configured to support transmission of broadcast information via the second type of control channel; and monitoring a search space in a control channel of the second type of control channel for a paging message, in response to receiving said broadcast message.

20. The method of claim 19, further comprising monitoring only the search space in the control channel of the second type of control channel for a paging message, in response to receiving said broadcast message.

* * * * *